(12) United States Patent
Childers et al.

(10) Patent No.: US 11,327,249 B2
(45) Date of Patent: May 10, 2022

(54) FIBER OPTIC FERRULE AND A GUIDE PIN CLAMP WITH FIELD CHANGEABLE GUIDE PINS

(71) Applicant: US Conec, Ltd, Hickory, NC (US)

(72) Inventors: Darrell R. Childers, Hickory, NC (US); Craig M. Conrad, Hickory, NC (US); Jason Higley, Hickory, NC (US); Jillcha F. Wakjira, Hickory, NC (US); Myron W. Yount, Conover, NC (US)

(73) Assignee: US Conec, Ltd., Hickory, NC (US)

( * ) Notice: Subject to any disclaimer, the term of this patent is extended or adjusted under 35 U.S.C. 154(b) by 0 days.

(21) Appl. No.: 16/927,556

(22) Filed: Jul. 13, 2020

(65) Prior Publication Data

US 2020/0341210 A1 Oct. 29, 2020

Related U.S. Application Data

(60) Continuation of application No. 16/265,275, filed on Feb. 1, 2019, now Pat. No. 10,712,510, which is a division of application No. 15/383,356, filed on Dec. 19, 2016, now Pat. No. 10,197,746.

(60) Provisional application No. 62/269,295, filed on Dec. 18, 2015.

(51) Int. Cl.
*G02B 6/38* (2006.01)

(52) U.S. Cl.
CPC ......... *G02B 6/3882* (2013.01); *G02B 6/3821* (2013.01); *G02B 6/3885* (2013.01); *G02B 6/3893* (2013.01); *G02B 6/3898* (2013.01)

(58) Field of Classification Search
CPC .. G02B 6/3821; G02B 6/3882; G02B 6/3885; G02B 6/3893; G02B 6/3898
See application file for complete search history.

(56) References Cited

U.S. PATENT DOCUMENTS

| | | | |
|---|---|---|---|
| 1,455,770 A | 5/1923 | Anderson | |
| 2,823,536 A | 2/1958 | Watson | |
| 2,947,160 A | 8/1960 | Wolters | |
| 3,233,440 A | 2/1966 | Strauss | |
| 3,238,495 A | 3/1966 | Lanius, Jr. | |
| 3,508,306 A | 4/1970 | Wright | |
| 3,675,499 A | 7/1972 | Andre | |
| 3,744,012 A * | 7/1973 | Gutshall | H01R 4/44 439/782 |
| 3,948,066 A | 4/1976 | Solovieff | |
| 4,240,685 A | 12/1980 | Terlecki | |
| 4,512,166 A * | 4/1985 | Dunphy | E05B 29/0013 70/366 |

(Continued)

OTHER PUBLICATIONS

Liu, Amelia, Cable Solutions, cables-solutions.com (Year: 2013).
USCONEC—Shareholder Information: Corning & Fujikura, 2015, available at http://www.usconec.com/company/overview.htm.

*Primary Examiner* — Peter Radkowski
(74) *Attorney, Agent, or Firm* — Michael L. Leetzow, P.A.; Shubhrangshu Sengupta

(57) ABSTRACT

A fiber optic ferrule and a guide pin clamp allows for changing guide pins in the field. The guide pin clamp has a forward clamp portion, a rearward clamp portion configured to engage the biasing spring and a guide pin retaining plate. The forward clamp portion and the rearward clamp portion move relative to one another to also move guide pin retaining plate from a first position to a second position to allow for the removal or insertion of guide pins.

14 Claims, 15 Drawing Sheets

(56) References Cited

U.S. PATENT DOCUMENTS

| | | |
|---|---|---|
| 4,683,732 A | 8/1987 | Beattie |
| 4,716,648 A | 1/1988 | Nel |
| 4,830,456 A | 5/1989 | Kakii et al. |
| 4,997,218 A * | 3/1991 | Culling .................. E05B 63/125 |
| | | 292/302 |
| 5,072,334 A | 12/1991 | Burgess et al. |
| 5,199,894 A * | 4/1993 | Kalny .................. H01R 13/622 |
| | | 285/82 |
| 5,331,830 A | 7/1994 | Su |
| 5,363,423 A | 11/1994 | Brashier et al. |
| 5,363,678 A | 11/1994 | Meckbach |
| 5,495,731 A | 3/1996 | Riznik |
| 5,600,747 A * | 2/1997 | Yamakawa .......... G02B 6/3879 |
| | | 385/59 |
| 5,640,861 A | 6/1997 | Chen |
| 5,692,079 A * | 11/1997 | Iso ........................ G02B 6/3885 |
| | | 385/59 |
| 5,870,515 A * | 2/1999 | Ott ........................ G02B 6/3825 |
| | | 385/59 |
| 5,964,239 A * | 10/1999 | Loux ........................ B01L 9/527 |
| | | 137/15.21 |
| 6,220,762 B1 * | 4/2001 | Kanai .................. G02B 6/3825 |
| | | 385/53 |
| 6,273,732 B1 | 8/2001 | Johnescu et al. |
| 6,299,460 B1 * | 10/2001 | Haselby ................. H01R 12/82 |
| | | 439/66 |
| 6,412,986 B1 | 7/2002 | Ngo et al. |
| 6,450,697 B1 | 9/2002 | Ngo |
| 6,464,407 B1 | 10/2002 | Ngo et al. |
| 6,478,476 B1 | 11/2002 | Katsura et al. |
| 6,497,516 B1 | 12/2002 | Toyooka et al. |
| 6,530,696 B1 * | 3/2003 | Ueda .................. G02B 6/3885 |
| | | 385/59 |
| 6,536,956 B2 | 3/2003 | Luther et al. |
| 6,572,272 B2 | 6/2003 | Ngo |
| 6,612,142 B1 | 9/2003 | Capwell |
| 6,616,343 B2 | 9/2003 | Katsura et al. |
| 6,682,230 B1 | 1/2004 | Demangone et al. |
| 6,819,855 B2 | 11/2004 | Fujiwara et al. |
| 6,964,525 B2 | 11/2005 | Ohtsuka et al. |
| 7,036,993 B2 * | 5/2006 | Luther .................. G02B 6/3846 |
| | | 385/53 |
| 7,296,935 B1 * | 11/2007 | Childers .............. G02B 6/3885 |
| | | 385/55 |
| 7,389,659 B1 | 6/2008 | Diaz et al. |
| 7,393,142 B2 | 7/2008 | Dean, Jr. et al. |
| 7,497,103 B1 | 3/2009 | Misner |
| 7,540,140 B1 | 6/2009 | Diaz et al. |
| 8,052,334 B2 | 11/2011 | Childers et al. |
| D683,705 S | 6/2013 | Katagiyama et al. |
| 8,678,670 B2 | 3/2014 | Takahashi et al. |
| 8,740,473 B2 * | 6/2014 | Katoh .................. G02B 6/3885 |
| | | 385/53 |
| 8,740,479 B2 | 6/2014 | Shitama et al. |
| 8,768,125 B2 | 7/2014 | Beatty et al. |
| 8,920,043 B2 | 12/2014 | Iwaya et al. |
| 9,091,825 B2 | 7/2015 | Takahashi et al. |
| 9,322,194 B2 | 4/2016 | Cheng et al. |
| 9,322,201 B1 | 4/2016 | Cheng et al. |
| 9,470,017 B1 | 10/2016 | Cheng et al. |
| 9,470,018 B1 | 10/2016 | Cheng et al. |
| 9,528,294 B2 | 12/2016 | Johnson et al. |
| 9,528,296 B1 | 12/2016 | Cheng et al. |
| 9,534,420 B1 | 1/2017 | Cheng et al. |
| 9,606,300 B2 | 3/2017 | Sasaki et al. |
| 9,778,425 B2 | 10/2017 | Nguyen et al. |
| 9,784,925 B2 | 10/2017 | Bushnell et al. |
| 9,817,194 B2 * | 11/2017 | Childers .............. G02B 6/3869 |
| 10,179,398 B2 * | 1/2019 | Rosenthal ............... B25B 27/10 |
| 10,197,746 B2 * | 2/2019 | Childers .............. G02B 6/3893 |
| 10,215,932 B2 * | 2/2019 | Childers .............. G02B 6/3869 |
| 10,712,510 B2 * | 7/2020 | Childers .............. G02B 6/3898 |
| 2001/0031116 A1 | 10/2001 | Katsura et al. |
| 2002/0064348 A1 | 5/2002 | Ngo |
| 2003/0021548 A1 | 1/2003 | Luther et al. |
| 2003/0068137 A1 | 4/2003 | Rolston et al. |
| 2003/0091297 A1 | 5/2003 | Hung et al. |
| 2004/0109646 A1 | 6/2004 | Anderson et al. |
| 2004/0152354 A1 * | 8/2004 | Luther .................. G02B 6/3865 |
| | | 439/378 |
| 2005/0069264 A1 * | 3/2005 | Luther .................. G02B 6/3821 |
| | | 385/59 |
| 2006/0285814 A1 | 12/2006 | Brown et al. |
| 2010/0129031 A1 | 5/2010 | Danley et al. |
| 2011/0083591 A1 | 4/2011 | Stepp |
| 2011/0262075 A1 | 10/2011 | Beatty et al. |
| 2012/0027359 A1 * | 2/2012 | Katoh .................. G02B 6/3885 |
| | | 385/78 |
| 2012/0213484 A1 * | 8/2012 | Childers .............. G02B 6/3821 |
| | | 385/134 |
| 2012/0281951 A1 | 11/2012 | Takahashi et al. |
| 2012/0284990 A1 * | 11/2012 | Rosenthal ............... B25B 27/10 |
| | | 29/428 |
| 2012/0321253 A1 | 12/2012 | Shimakawa et al. |
| 2013/0121653 A1 | 5/2013 | Shitama et al. |
| 2013/0216185 A1 | 8/2013 | Klavuhn et al. |
| 2014/0105548 A1 | 4/2014 | Takahashi et al. |
| 2014/0147084 A1 | 5/2014 | Yabre et al. |
| 2014/0219609 A1 | 8/2014 | Nielson et al. |
| 2014/0265359 A1 | 9/2014 | Cheng et al. |
| 2015/0102610 A1 | 4/2015 | Johnson et al. |
| 2015/0104135 A1 | 4/2015 | Bushnell et al. |
| 2015/0198766 A1 | 7/2015 | Takahashi et al. |
| 2016/0189502 A1 | 6/2016 | Johnson et al. |
| 2016/0189503 A1 | 6/2016 | Johnson et al. |
| 2017/0102505 A1 | 4/2017 | Nguyen et al. |

* cited by examiner

FIBER OPTIC FERRULE AND A GUIDE PIN CLAMP WITH FIELD CHANGEABLE GUIDE PINS

REFERENCE TO RELATED CASE

This application claims priority under 35 U.S.C. § 119 (e) to provisional application No. 62/269,295 filed on Dec. 18, 2015, and under 35 U.S.C. § 120 to U.S. patent application Ser. No. 15/383,356 filed on Dec. 19, 2016, as a divisional application thereof and U.S. patent Ser. No. 16/265,275 filed on Feb. 1, 2019, the contents of which are hereby incorporated by reference in their entirety.

BACKGROUND OF THE INVENTION

Field of the Invention

Fiber optic connectors, particularly ones having a higher number of components, like MTP connectors, are assembled with guide pins either installed or not installed. It is difficult, if not impossible, to change this configuration once the fiber optic connector is in the field. Thus, if the installer has two fiber optic connectors of one configuration (male or female) that need to be mated together, the installer has a problem because male-to-male and female-to-female matings are not possible. Guide pins, if used, are attached to a guide pin clamp (or may also be called a guide pin keeper). The guide pin clamp serves a number of functions, including holding the guide pins in a male configuration and centering a spring that biases the fiber optic ferrule towards the front end of the fiber optic connector. Since the guide pins are connected to the guide pin clamp and extend through the fiber optic ferrule, they are not easily removed once the fiber optic connector is completed. In a traditional female configuration, the guide pin clamp may have short extensions that are inserted into the guide pin holes in the fiber optic ferrule to align the pin clamp and the spring with the fiber optic ferrule. However, using such a guide pin clamp prevents any attempt to change the fiber optic connector between a female configuration and a male configuration due to the short extensions.

When the fiber optic connector is made with the intention of being able to field-covert the fiber optic connector from one configuration to another, the ability to align the pin clamp with the fiber optic ferrule is severely compromised, if not totally destroyed. Thus, a fiber optic connector that allows for the guide pins to be inserted or removed in the field without removing any of other components of the fiber optic connector and maintaining alignment with the fiber optic ferrule is needed.

SUMMARY OF THE INVENTION

The present invention is directed to a pin clamp for use with a fiber optic connector, the fiber optic connector having at least one housing, a fiber optic ferrule disposed at least partially within the at least one housing of the fiber optic connector, the fiber optic ferrule having guide pin openings extending from a front face to a rear face of the fiber optic ferrule to receive a guide pin therein, a spring, and a spring push, the pin clamp that includes a forward clamp portion to engage the rear face of the fiber optic ferrule, the forward clamp portion having two guide pin openings therethrough to receive a guide pin in each of the two guide pin openings, a rearward clamp portion configured to engage the spring for biasing the fiber optic ferrule in the fiber optic connector and two guide pin receptacles to receive at least a portion of one of the guide pins, and a guide pin retaining plate at least partially disposed between the forward clamp portion and the rearward clamp portion, the guide pin retaining plate configured to engage a portion of each of the guide pins.

In some embodiments, the forward clamp portion has a front face and a rear face, at least one rearward tab extending from the rear face and away from the forward clamp portion to engage a portion of the rearward clamp portion and at least one sloped surface to engage a tab extending from a front face of the rearward clamp portion.

In some other embodiments, the rearward clamp portion has a front face and a rear face, the rear face configured to engage the spring for biasing the fiber optic ferrule, at least one sloped surface on the front face of the rearward clamp portion to engage the tab extending from the rear face of the forward clamp portion.

In some other embodiments, wherein the forward clamp portion and the rearward clamp portion each have two tabs to engage corresponding sloped surfaces on the other of the forward clamp portion and the rearward clamp portion.

In another embodiment, one of the clamp portions is moveable between a first position and a second position, and wherein in the second position the guide pin openings in the forward clamp portion and the openings in guide pin retaining plate are aligned with one another.

According to another aspect of the present invention, there is a fiber optic connector having field-changeable guide pins that includes at least one housing defining a passageway, a fiber optic ferrule disposed at least partially within the passageway of the at least one housing of the fiber optic connector, the fiber optic ferrule having guide pin openings extending through the fiber optic ferrule from a front face to a rear face thereof to receive a field-changeable guide pin therein, a pin clamp comprising a forward clamp portion, a rearward clamp portion and a guide pin retaining plate, wherein the forward clamp portion is configured to engage the rear face of the fiber optic ferrule, the forward clamp portion having two guide pin openings therethrough to receive a field-changeable guide pin in each of the two guide pin openings, and wherein the rearward clamp portion is configured to engage a spring for biasing the fiber optic ferrule in the fiber optic connector and has two guide pin cavities to receive at least a portion of one of the field-changeable guide pins, and wherein the guide pin retaining plate is disposed between the forward clamp portion and the rearward clamp portion, the guide pin retaining plate configured to engage a portion of each of the guide pins, the spring disposed within the at least one housing and rearwardly of the pin clamp; and a spring push engaging the spring and the connector housing to retain the spring and fiber optic ferrule within the connector housing.

According to yet another aspect of the present invention, there is a pin clamp for use with a fiber optic connector, the fiber optic connector having at least one housing, a fiber optic ferrule disposed at least partially within the at least one housing of the fiber optic connector, the fiber optic ferrule having guide pin openings extending from a front face to a rear face of the fiber optic ferrule to receive a guide pin therein, a spring, and a spring push, the pin clamp that includes a forward clamp portion to engage the rear face of the fiber optic ferrule, the forward clamp portion having two guide pin openings therethrough to receive a guide pin in each of the two guide pin openings, a rearward clamp portion configured to engage the spring for biasing the fiber optic ferrule in the fiber optic connector and two guide pin receptacles to receive at least a portion of one of the guide pins, and at least one guide pin retaining plate at least partially disposed between the forward clamp portion and the rearward clamp portion, the forward clamp portion and the rearward clamp portion movable relative to one another between a first position and a second position and the guide pin retaining plate configured to engage a portion of each of the guide pins in the first position.

It is to be understood that both the foregoing general description and the following detailed description of the present embodiments of the invention are intended to provide an overview or framework for understanding the nature and character of the invention as it is claimed. The accompanying drawings are included to provide a further understanding of the invention and are incorporated into and constitute a part of this specification. The drawings illustrate various embodiments of the invention and, together with the description, serve to explain the principles and operations of the invention.

DETAILED DESCRIPTION OF THE PREFERRED EMBODIMENTS

Figure 1:
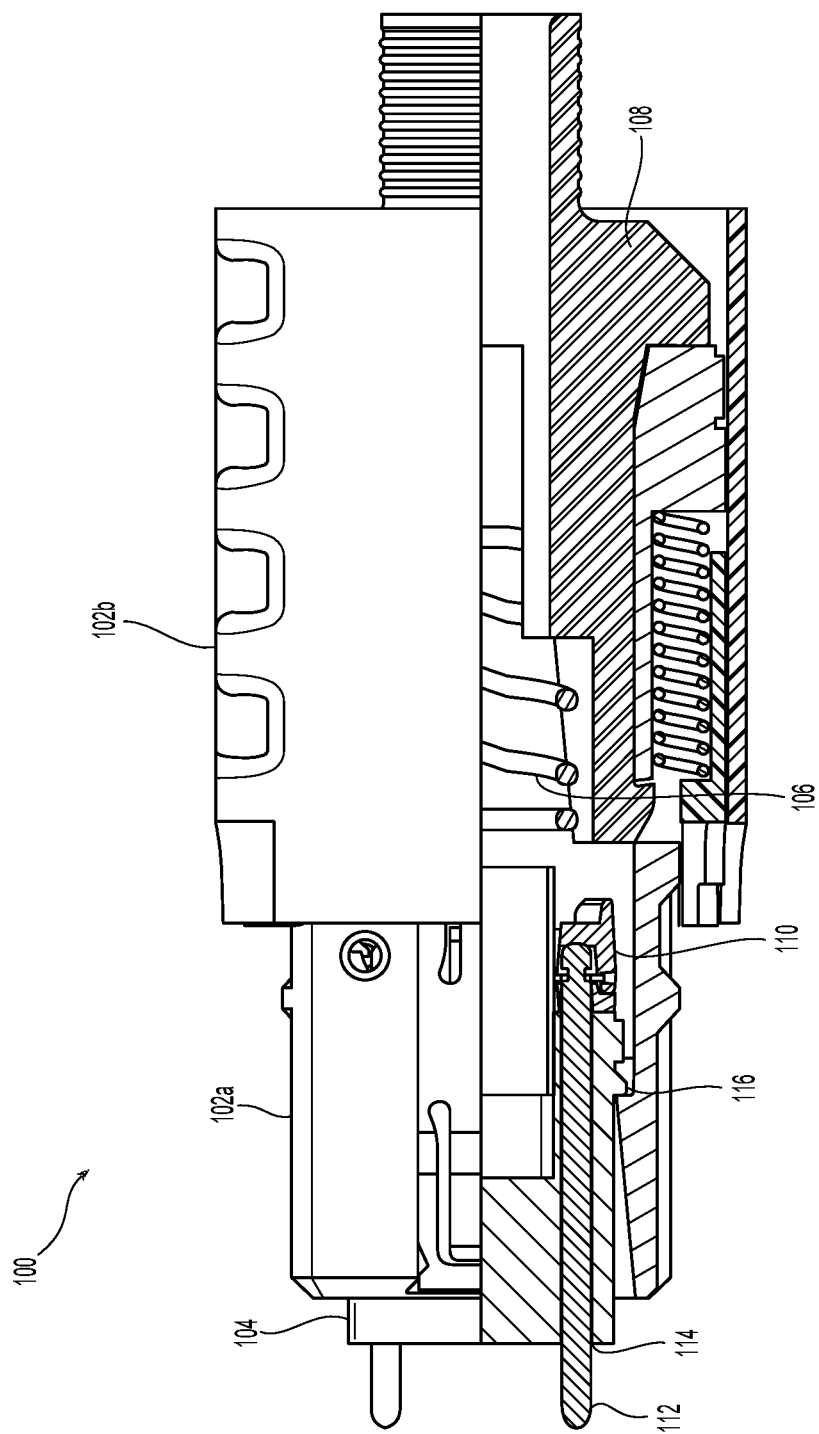
FIG. 1 is a partial cross sectional view of one embodiment of a fiber optic connector according to the present invention.

Reference will now be made in detail to the present preferred embodiment(s) of the invention, examples of which are illustrated in the accompanying drawings. Whenever possible, the same reference numerals will be used throughout the drawings to refer to the same or like parts.

Figure 4:
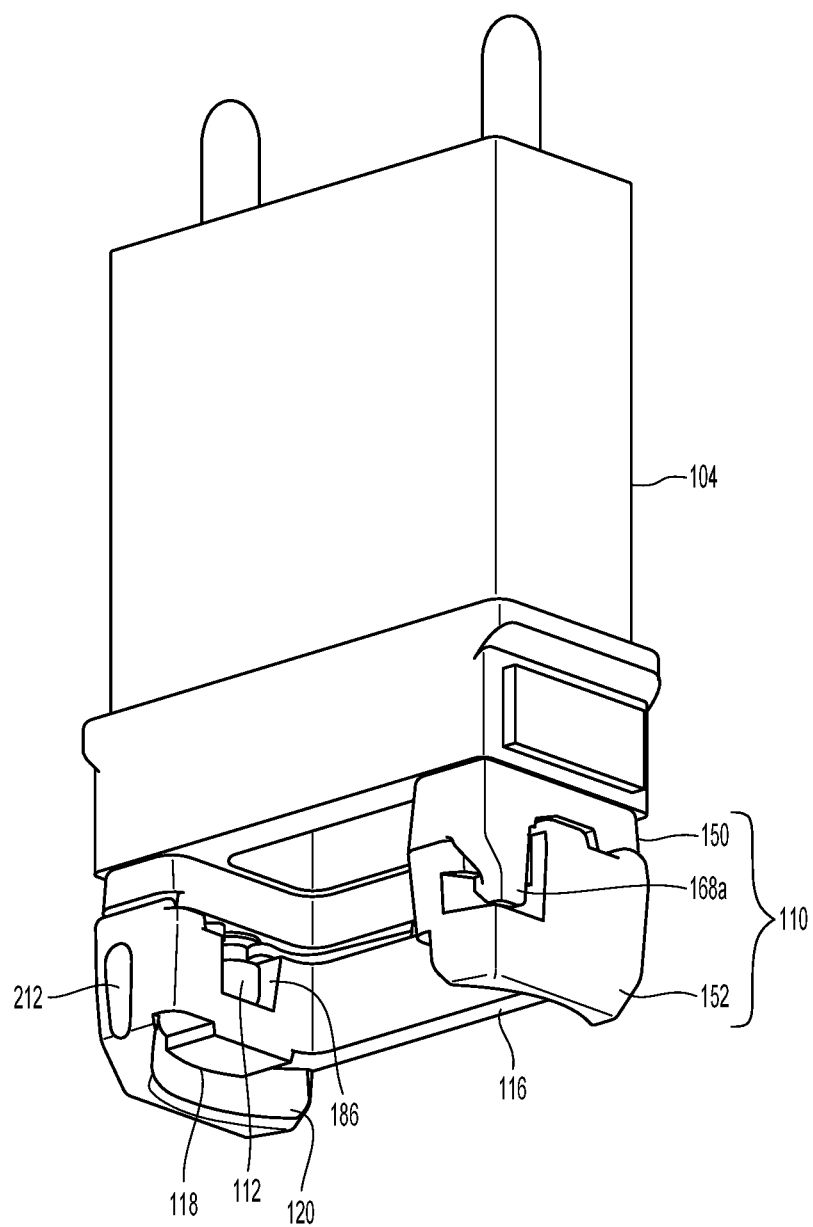
FIG. 4 is a perspective view of the fiber optic ferrule and pin clamp in FIG. 2 showing the rear, bottom, and left sides thereof.
Figure 5:
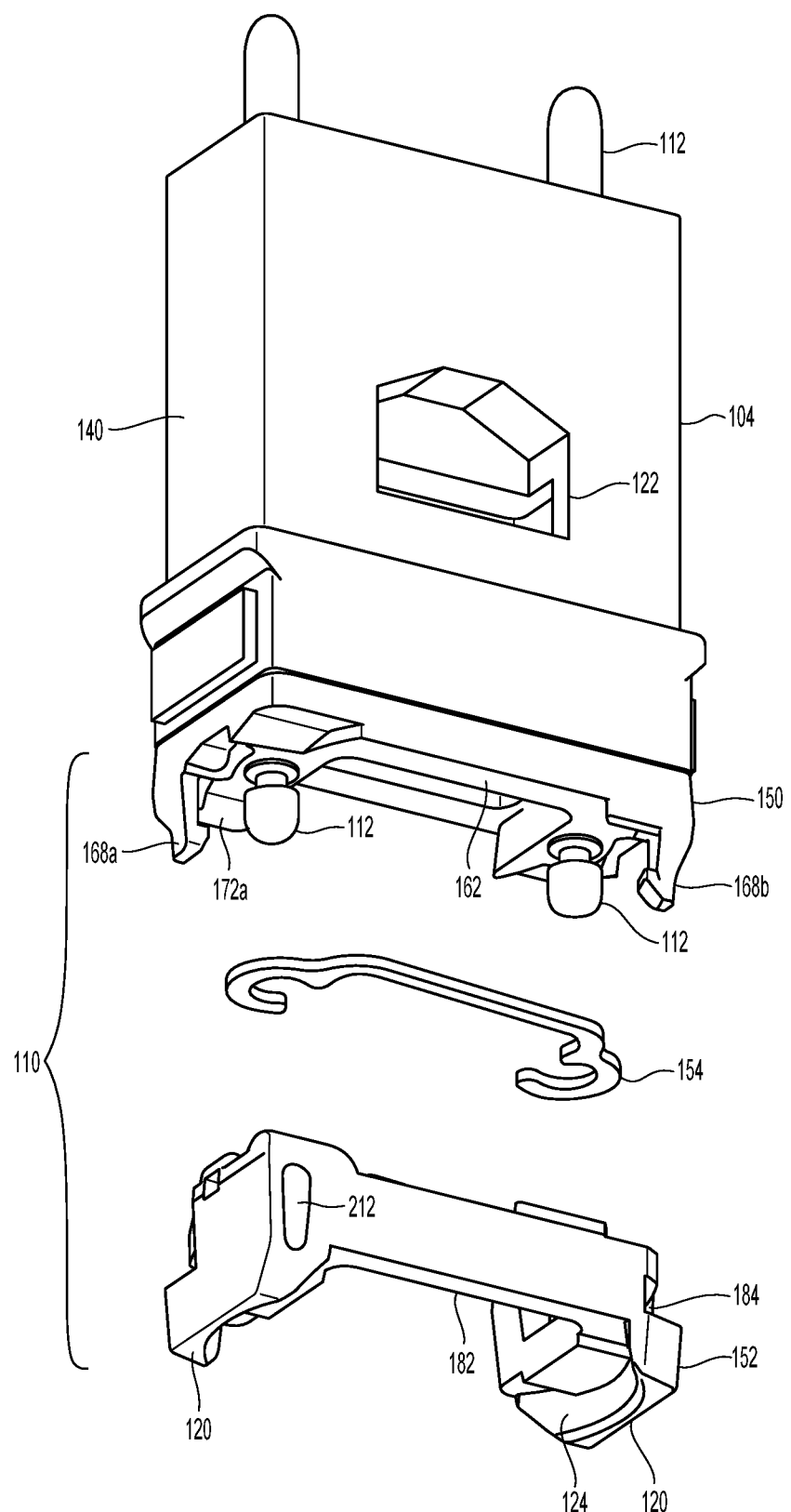
FIG. 5 is a partially exploded view of the fiber optic ferrule and pin clamp of FIG. 2 with the rearward clamp portion and guide pin retaining plate pulled rearwardly.
Figure 6:
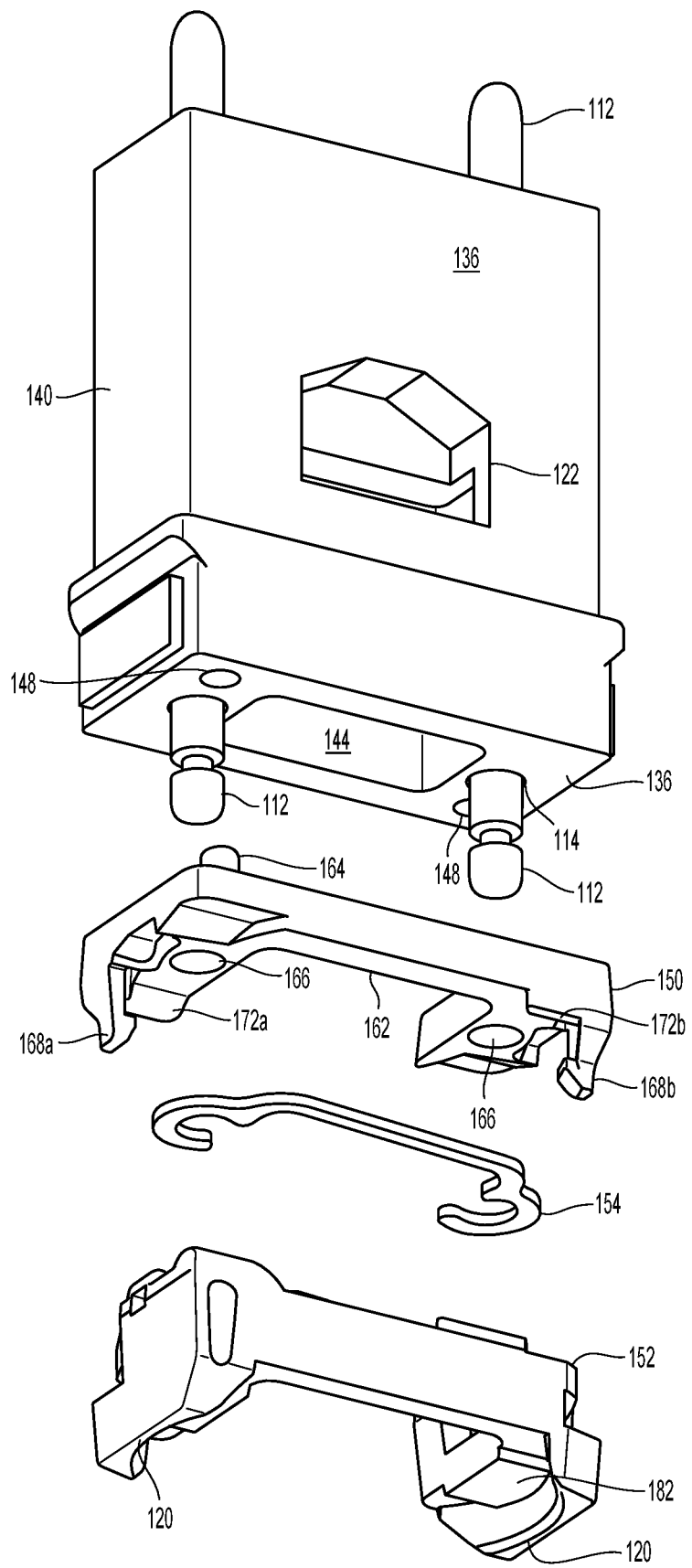
FIG. 6 is a perspective view from the rear of the fiber optic ferrule and pin clamp of FIG. 5 with the forward clamp portion, the rearward clamp portion, and the guide pin retaining plate pulled away from the fiber optic ferrule.
Figure 7:
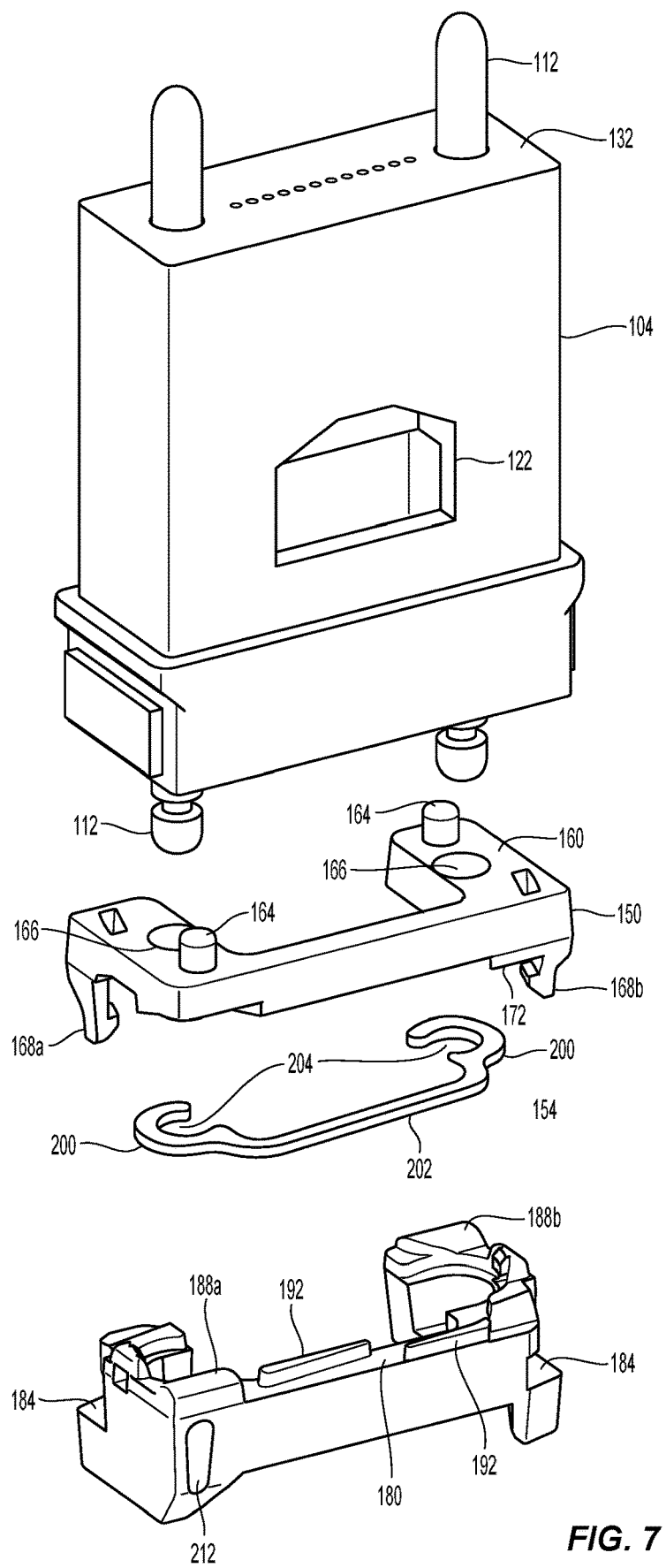
FIG. 7 is a perspective view from the front of the fiber optic ferrule and pin clamp of FIG. 5 with the forward clamp portion, the rearward clamp portion, and the guide pin retaining plate pulled away from the fiber optic ferrule.

Referring to FIG. 1, a fiber optic connector 100 according to one embodiment of the present invention is illustrated. The fiber optic connector 100 includes a connector inner housing 102a and outer housing 102b, a fiber optic ferrule 104, a spring 106, a spring push 108, a guide pin clamp 110, and guide pins 112 in guide pin holes 114. As is known in the art, the fiber optic ferrule 104 is inserted into the connector housing 102 and it engages a seating surface 116, which prevents the fiber optic ferrule 104 from traveling too far toward the front of the connector housing 102. The spring 106 is inserted behind the guide pin clamp 110, which is behind the fiber optic ferrule 104 to bias the fiber optic ferrule 104 toward the seating surface 116. A spring push 108 engages the back end of the spring 106 and the connector housing 102, securing the fiber optic ferrule 104, a spring 106, the spring push 108, and the guide pin clamp 110 in the connector housing 102. When the fiber optic connector 100 engages another fiber optic ferrule (not shown), the fiber optic ferrules 104 of the two fiber optic connectors engage one another, causing the spring 106 to be compressed between the guide pin clamp 110 (which engages the rear end of fiber optic ferrule 104) and the spring push 108. The fiber optic ferrule 104 is pushed rearwardly and the fiber optic ferrule 104 is unseated from the seating surface 116. As long as the spring 106 squarely engages the back end 118 of the guide pin clamp 110, then the fiber optic ferrule 104 can appropriately engage the other fiber optic ferrule. The spring 106 is designed to engage the back end 118 of the guide pin clamp 110 adjacent the two spring retaining members 120. See also FIG. 4. However, the spring 106 may also engage the back end 116 of the guide pin clamp 110 on other surfaces on the back end 118 of the guide pin clamp 110. When the spring 106 contacts only a portion of the guide pin clamp 110, an off-axis moment is created and interferes with the mating of the fiber optic ferrules. More discussion of the off-axis force issues and structures to be added to a guide pin clamp are discussed in co-pending application Ser. No. 15/137,303, filed on Apr. 25, 2016, the contents of which are incorporated herein in their entirety.

Turning to FIGS. 2-9, one embodiment of a combination of a fiber optic ferrule 104 and a guide pin clamp 110 according to the present invention is illustrated. As is known in the art, a guide pin clamp is installed behind the fiber optic ferrule to hold the guide pins in the ferrule (for the male version) when the fiber optic connector is mated and unmated with another fiber optic connector. As a result, the guide pins can not be removed from the fiber optic connector. In the female version, a guide pin clamp typically keeps the spacing correct within the fiber optic connector, eliminating the need for different springs to bias the fiber optic ferrule in the connector.

Figure 2:
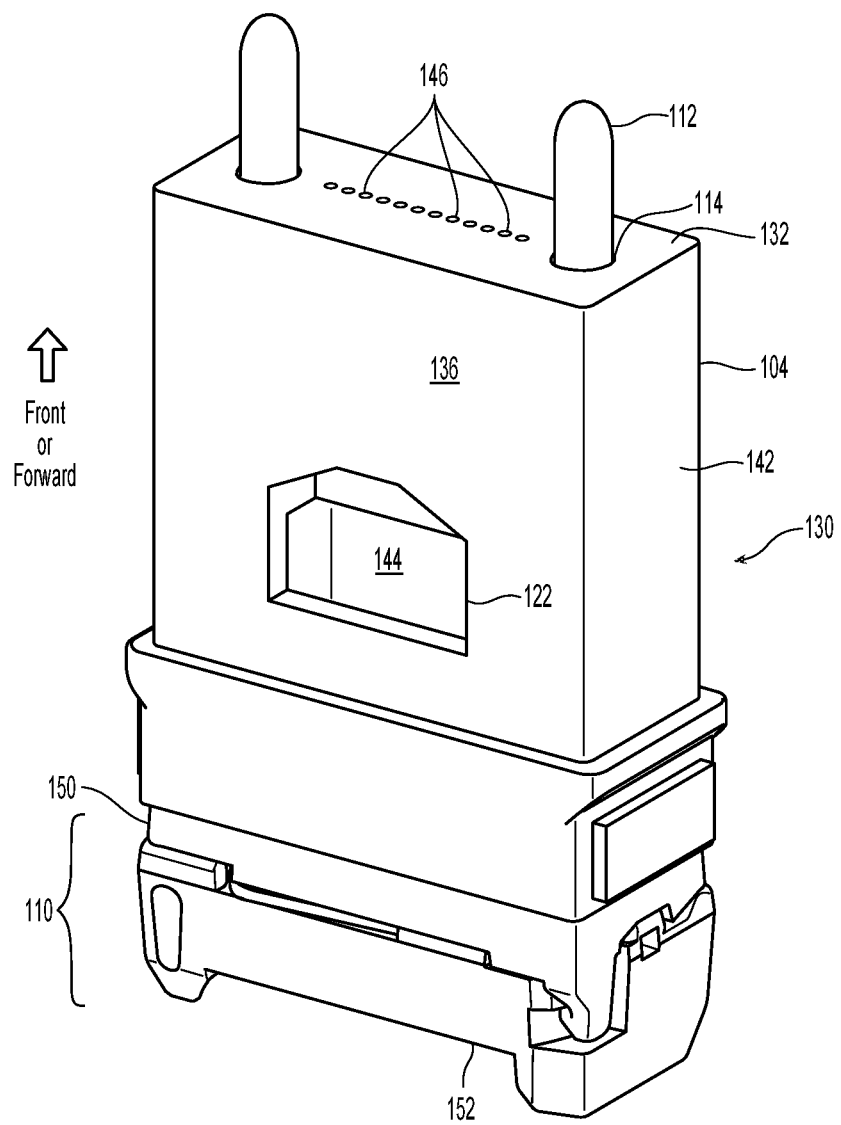
FIG. 2 is a perspective view of one embodiment of a fiber optic ferrule and pin clamp according to the present invention showing the front, top, and right sides thereof.
Figure 3:
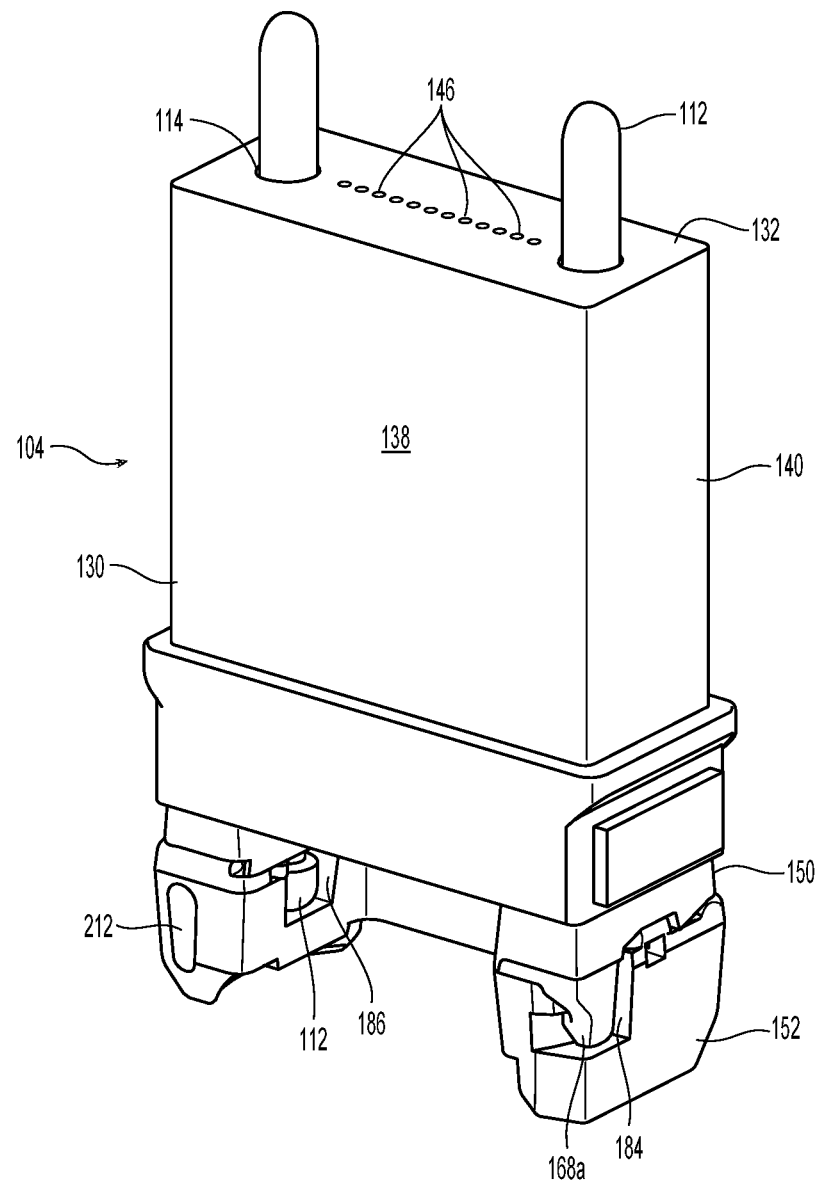
FIG. 3 is a perspective view of the fiber optic ferrule and pin clamp in FIG. 2 showing the front, bottom, and left sides thereof.

As used herein, the term "front" and "forward" means that direction where the fiber optic connector would mate with another fiber optic connector or device, while the term "rear" or "rearward" is used to mean the direction from which the optical fibers enter into the fiber optic ferrule. So turning to FIG. 2, the front is the direction shown by the arrow and "back" or "rearward" is the opposite direction. Thus, the front of the fiber optic ferrule 104 is pointed out of the page in FIG. 2 and the rear or rearward end of the fiber optic ferrule 104 (and the guide pin clamp) is pointing downward into the paper. Similarly, the top of the fiber optic ferrule is that side that has an opening 122 into the fiber optic ferrule as illustrated in FIG. 2 while the bottom is the large surface 138 in FIG. 3.

The fiber optic ferrule 104 has a main body 130 having a front face 132, a rear face 134 (see FIG. 6), a top 136, a bottom 138 (see FIG. 3), two sides 140,142, and a first opening 144 extending from the rear face 134 toward the front face 132. The first opening 144 is configured to receive optical fibers (not shown) which transmit the light through the fiber optic ferrule 104. The fiber optic ferrule 104 also has a plurality of optical fiber openings 146 disposed in the main body 130 between the front face 132 and the first opening 144, each of the optical fiber openings 146 to receive an optical fiber therein (not shown). The rear face 134 also has at least two openings 148 (see FIG. 6) extending from the rear face 134 into the main body 130 towards the front face 132

The guide pin clamp 110 has a forward clamp portion 150 and a rearward clamp portion 152, the forward clamp portion 150 and the rearward clamp portion 152 having a guide pin retaining plate 154 therebetween. While the three components of the guide pin clamp 110 are illustrated as being independent elements, they may also be connected or otherwise attached to one another and still come within the scope of the present invention. Additionally, the guide pin retaining plate 154 may also be divided into two portions rather than being a single element.

The forward clamp portion 150 is that portion of the guide pin clamp 110 that is closest to and engages the fiber optic ferrule 104. The forward clamp portion 150 has a front face 160 and a rear face 162. See FIGS. 6 & 7. The forward clamp portion 150 has at least two projections 164 extending from the front face 160 and away from the forward clamp portion 150. The two projections 164 are configured to engage the two openings 148 in the rear face 134 of the main body 130. The engagement of the fiber optic ferrule 104 by the forward clamp portion 150 (in conjunction with the other portions of the guide pin clamp 110) aligns the spring 106 with the fiber optic ferrule 104 for consistent biasing force as explained above. While two projections 164 are illustrated on the front face 160, there may also be three, four or more projections to align the fiber optic ferrule 104 and the forward clamp portion 150. The projections 164 may also be of different sizes (e.g., smaller or larger) and may also be of a different shape (e.g., oval, square, rectangle, etc.). The forward clamp portion 150 may also be aligned with the fiber optic ferrule 104 by the connector inner housing 102a or by structures on the connector inner housing 102a. As illustrated, the forward clamp portion 150 is generally u-shaped (as are all of the components 150, 152, 154 of the guide pin clamp 110) to allow optical fibers to pass through the guide pin clamp 110 and into the fiber optic ferrule 104. This configuration also allows for the components of the guide pin clamp 110 to be added after the fiber optic ferrule 104 is installed on the optical fibers if necessary. The forward clamp portion 150 also has two guide pin openings 166 extending through the forward clamp portion 150 to receive the guide pins 112. However, the forward clamp portion 150 need not have separate guide pin openings 166 but the guide pins could pass through the u-shaped portion (even if it were an extended portion).

On the rear face 162 of the forward clamp portion 150 are two extensions 168a, 168b that extend away from the rear face 162 and the forward clamp portion 150 in a rearward direction to cooperate with the rearward clamp portion 152 during the relative movement of the forward clamp portion 150 and the rearward clamp portion 152, as explained in further detail below. The two extensions 168a, 168b are disposed on opposite corners of the forward clamp portion 150.

The forward clamp portion 150 also includes two helical ramp surfaces 170a and 170b that cooperate with a portion of the rearward clamp portion 152 during insertion or removal of the guide pins 112. See FIG. 8. Adjacent to the extensions 168a, 168b (i.e., on the same corners of the forward ramp portion 150 as the extensions 168) are tabs 172a, 172b that engage corresponding ramp surfaces on the rearward clamp portion 152.

The rearward clamp portion 152 provides a dual function—it is a component of the guide pin clamp 110 and provides a structure for engaging the spring 106. The rearward clamp portion 152 has a front face 180 and a rear facing portion 182. The front face 180 has two slots or cavities 184 that correspond to the two extensions 168 that extend away from the rear face 162 of the forward clamping portion 150. When the two extensions 168a, 168b that extend away from the rear face 162 are disposed within the two openings 184, the two clamp portions cooperate with one another to move the guide pin retaining plate 154 so that the guide pins 112 may be inserted or removed from the fiber optic connector.

The rearward clamp portion 152 also includes two openings or cavities 186 to receive the ends of the guide pins 112 therein. The openings 186 are illustrated best in FIGS. 7 & 8 as being more of a u-shaped void than as a circular hole like those illustrated as openings 166. It should be noted that the guide pins 112 do not need to engage the rearward clamp portion 152, as the guide pins 112 are secured to the pin clamp 110 by the guide pin retaining plate 154 as discussed in more detail below.

The rearward clamp portion 152 also has two tabs 188a, 188b extending from the front face 180 and away from the rearward clamp portion 152. Thus, tabs 188a, 188b extend toward the forward clamp portion 150 to engage the two helical ramp surfaces 170a and 170b, respectively. The rearward clamp portion 152 similarly has two helical ramp surfaces 190a and 190b that engage tabs 172a, 172b on the front clamp portion 150. The combination of the tabs (tabs 172a, 172b, 188a, 188b) with the helical ramp surfaces (170a, 170b, 190a, and 190b) acts as a cam when one of the forward clamp portion 150 and the rearward clamp portion 152 is rotated relative to the other.

Figure 8:
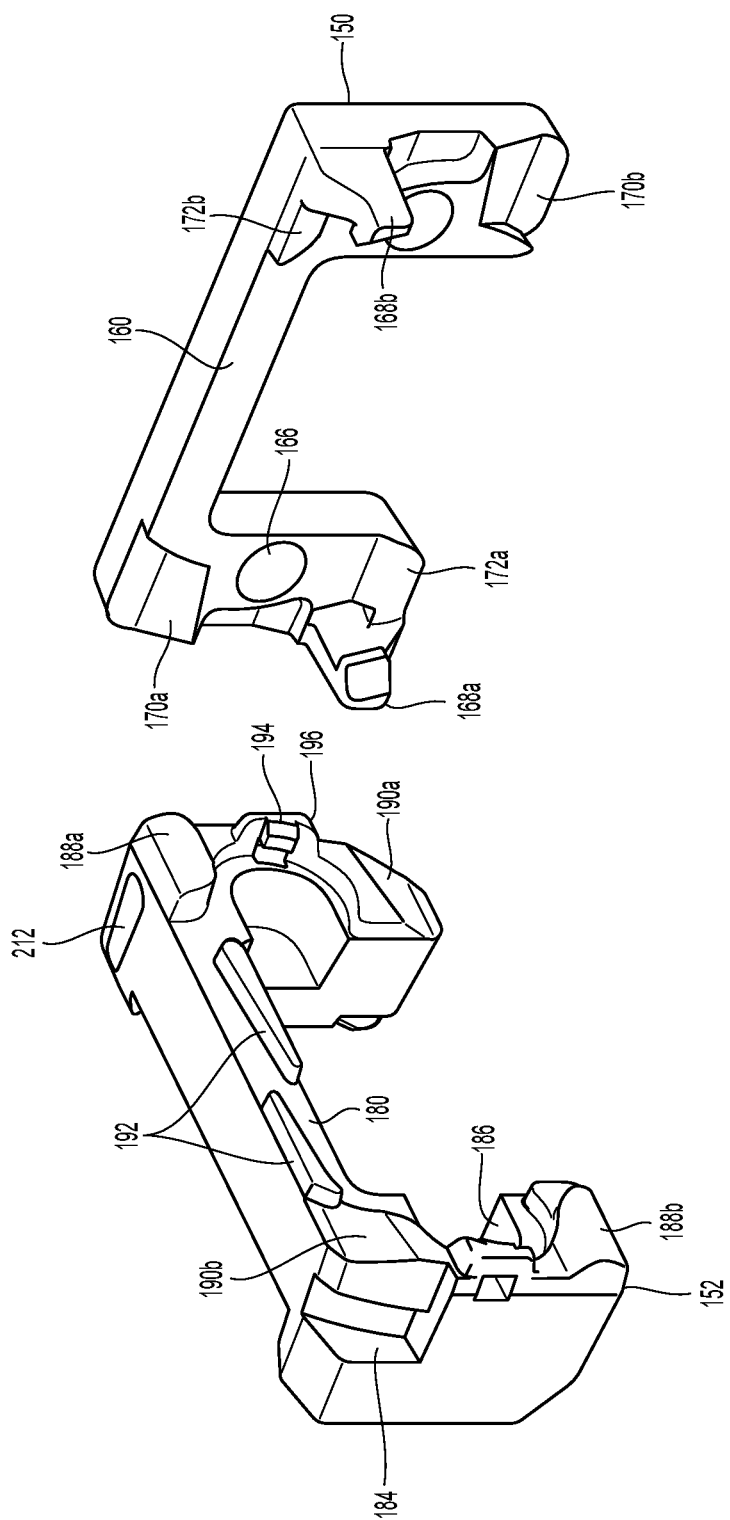
FIG. 8 is an exploded view of the forward clamp portion and the rearward clamp portion of FIG. 4 showing the engagement portions thereof.

To retain the guide pin retaining plate 154 between the forward and the rearward clamp portions, the rearward clamp portion 152 has on its front face 180 at least one guide pin retaining plate projection 192. As illustrated in FIG. 8, there may two such guide pin retaining plate projections 192. As would be known to one of skill in the art, while two separate projections are illustrated, they could also be connected to one another to capture a portion of the guide pin retaining plate 154. Another structure on the rearward clamp portion 152 is a guide pin retaining plate tab 194. The guide pin retaining plate tabs 194 extend from the front face 180 adjacent the guide pin cavities 186. At the end of the guide pin retaining plate tabs 194 is a rearward facing surface 196.

The rear facing portion 182 of the rearward clamp portion 152 is configured to engage the spring 106 for biasing the fiber optic ferrule 104 towards the front of the fiber optic connector 100. The rearward clamp portion 152 has the two spring retaining members 120 that have an inside surface 124 that is preferably shaped to retain the spring 106.

The guide pin retaining plate 154 is, as best illustrated in FIGS. 5-7 and 9, disposed between the forward clamp portion 150 and the rearward clamp portion 152. The guide pin retaining plate 154 has two partially circular portions 200 joined by an elongated member 202. Each of partially circular portions 200 form an opening 204 to allow a portion of each of the guide pins 112 to pass therethrough and into the guide pin cavities 186 in the rearward clamp portion 152.

Figure 9:
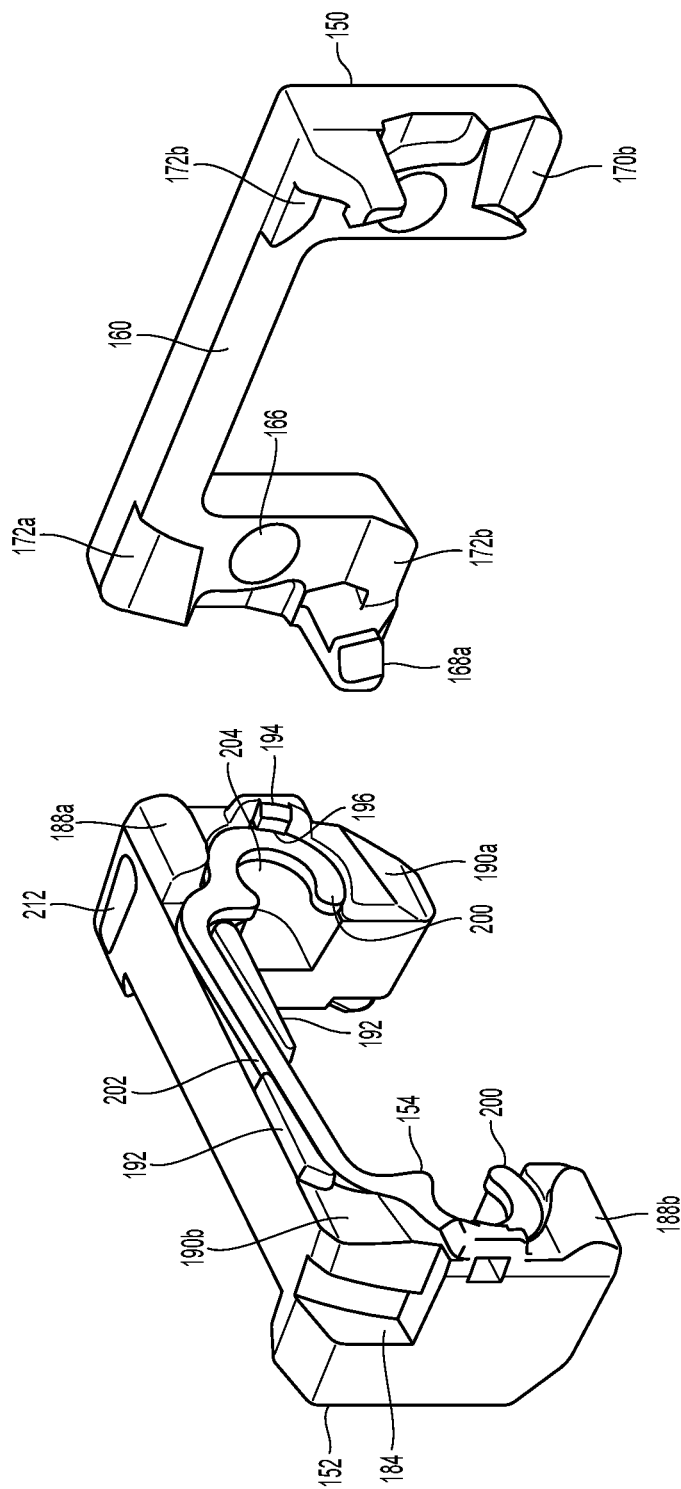
FIG. 9 is an exploded view of the forward clamp portion, the rearward clamp portion, and the guide pin retaining plate engaging the rearward clamp portion.

Turning now to FIG. 9, the guide pin retaining plate 154 is disposed on the rearward clamp portion 152 with the elongated member 202 passing between the two guide pin retaining plate projections 192. At the same time, the two partially circular portions 200 are disposed between the front face 180 of the rearward clamp portion 152 and the rearward facing surface 196 of the guide pin retaining plate tabs 194. The guide pin retaining plate 154 will now move with the rearward clamp portion 152. It should be noted that there is sufficient spacing (gaps) between the structures (guide pin retaining plate projections 192 and the front face 180 of the rearward clamp portion 152) holding the guide pin retaining plate 154 so that the guide pin retaining plate 154 may move (slightly) relative to the rearward clamp portion 152.

It should be noted that the pieces (150, 152, and 154) of the guide pin clamp 110 are biased together due to the spring 106 exerting force on the rearward clamp portion 154 on the one side and the fiber optic ferrule 104 providing a stop for the guide pin clamp 110 on the other side.

Figure 10:
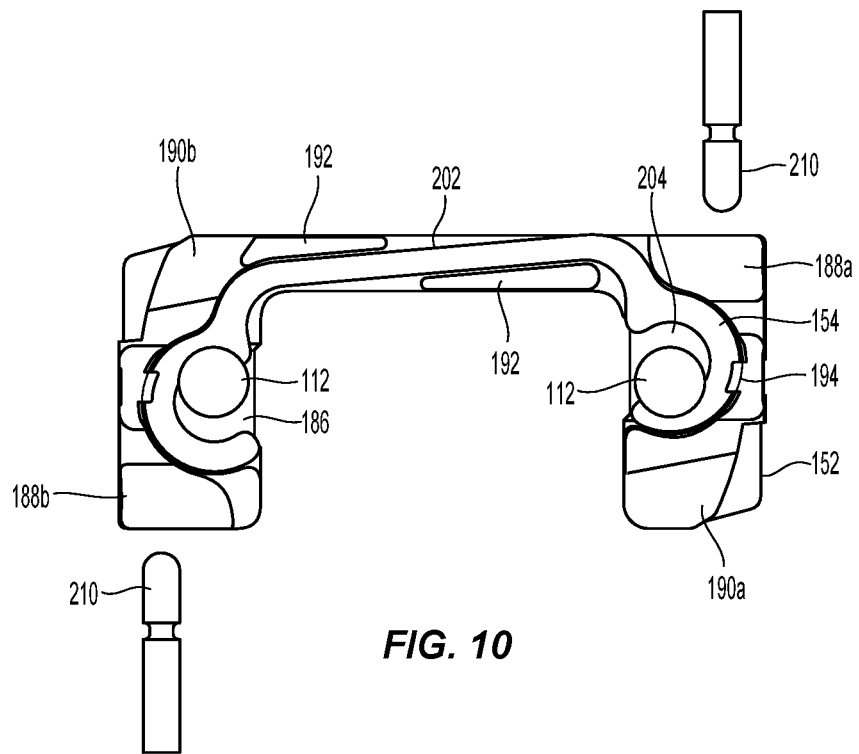
FIG. 10 is a plan view of the guide pin retaining plate engaging the rearward clamp portion in the first position.
Figure 11:
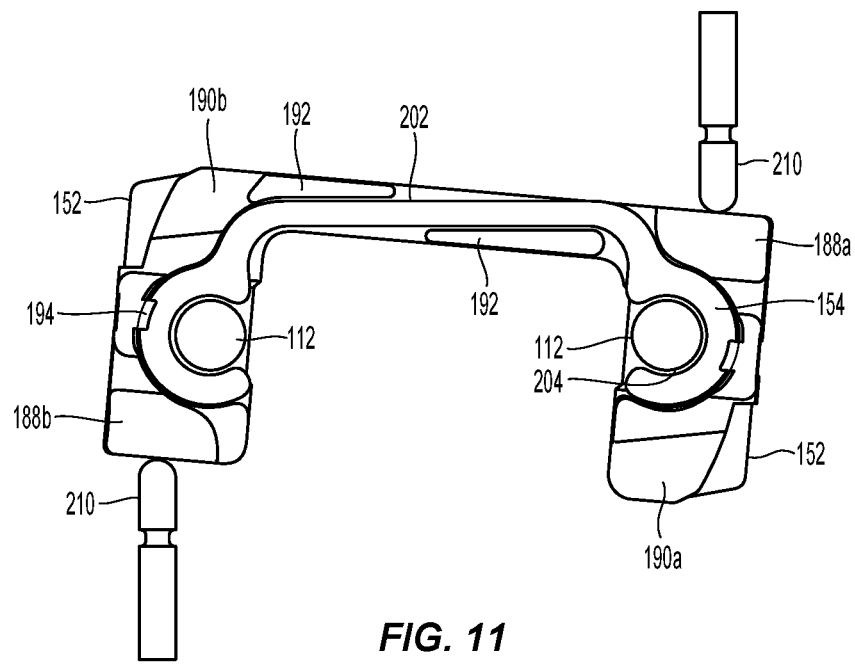
FIG. 11 is a plan view of the guide pin retaining plate engaging the rearward clamp portion in the second position.

FIGS. 10 & 11 illustrate the operation of the guide pin clamp 110. When one of the forward clamp portion 150 and the rearward clamp portion 152 is rotated relative to the other, the guide pin retaining plate 154 moves with the portion that is moved. So, as illustrated in the FIGS. 10 and 11, the rearward clamp portion 152 is rotated using a tool 210 (which as illustrated may be a guide pin or specialized tool) that is pushed on one side at the top of the rearward clamp portion 152 and at the same time on the bottom of the rearward clamp portion 152 on the other side. See, e.g., FIGS. 6-7, 10-11, and 15-16. There may be indentations 212 to receive an end of the tool 210. Without the tool 210 providing force on the rearward clamp portion 152, the pin clamp 100 is in the first position and the guide pin retaining plate 154 engages a portion of the guide pins. See FIG. 10. The spring 106 exerts a force on the rearward clamp portion 152, and together with the tabs (172a, 172b, 188a, 188b) and the helical ramp surfaces (170a, 170b, 190a, and 190b), the rearward clamp portion 152 remains in the first position. In this position, the guide pin retaining plate 154 engages a cut-out or reduced radius portion of the guide pins (if the are inserted into the fiber optic ferrule 104). Preferably, the forward clamp portion 150 and the rearward clamp portion 152 are also aligned with one another. When the tool 210 is used (as in FIG. 11), the downward force on one side and the upward force on the other side of the rearward clamp portion 152 causes the rearward clamp portion 152 to move, and in this case rotate in a clockwise direction, relative to the forward clamp portion 150. Since the guide pin retaining plate 154 is engaged with the rearward clamp portion 152, the guide pin retaining plate 154 rotates with the rearward clamp portion 152. See FIG. 11. This motion causes the openings 204 to align with the guide pins 112, the openings in the fiber optic ferrule 104, and the forward clamp portion 150, thereby releasing a guide pin 112 that may be removed. If the operator is attempting to change the orientation from a female connector to a male connector, then the motion of rearward clamp portion 152 allows for guide pins 112 to be inserted into the fiber optic connector 100. After insertion of the guide pins, the tool 210 is removed and the rearward clamp portion 152 and the guide pin retaining plate 154 rotate in a counterclockwise direction back to the first position due to the force of the spring 106.

It is also possible to change the gender from female to male by simply pushing the guide pins 112 into the fiber optic ferrule 104. The radiused back end of the guide pins 112 will engage the guide pin retaining plate 154 and cause it and the rearward clamp portion 152 to rotate sufficiently to allow the guide pins 112 to be inserted. The bias on the pin clamp 100 will cause the guide pin retaining plate 154 and the rearward clamp portion 152 to rotate back to the first position, engaging the guide pins 112.

Figure 12:
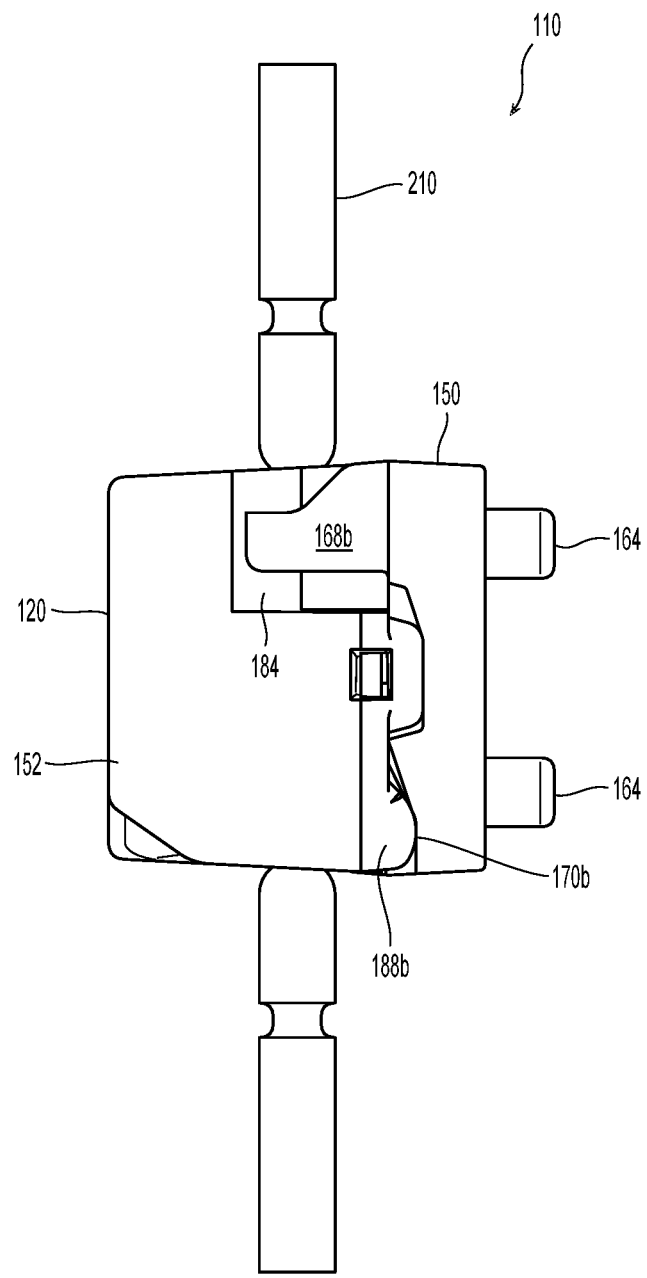
FIG. 12 is a left side view of the pin clamp prior to engagement by a tool used to move one of the forward clamp portion and the rearward clamp portion relative to one another.
Figure 13:
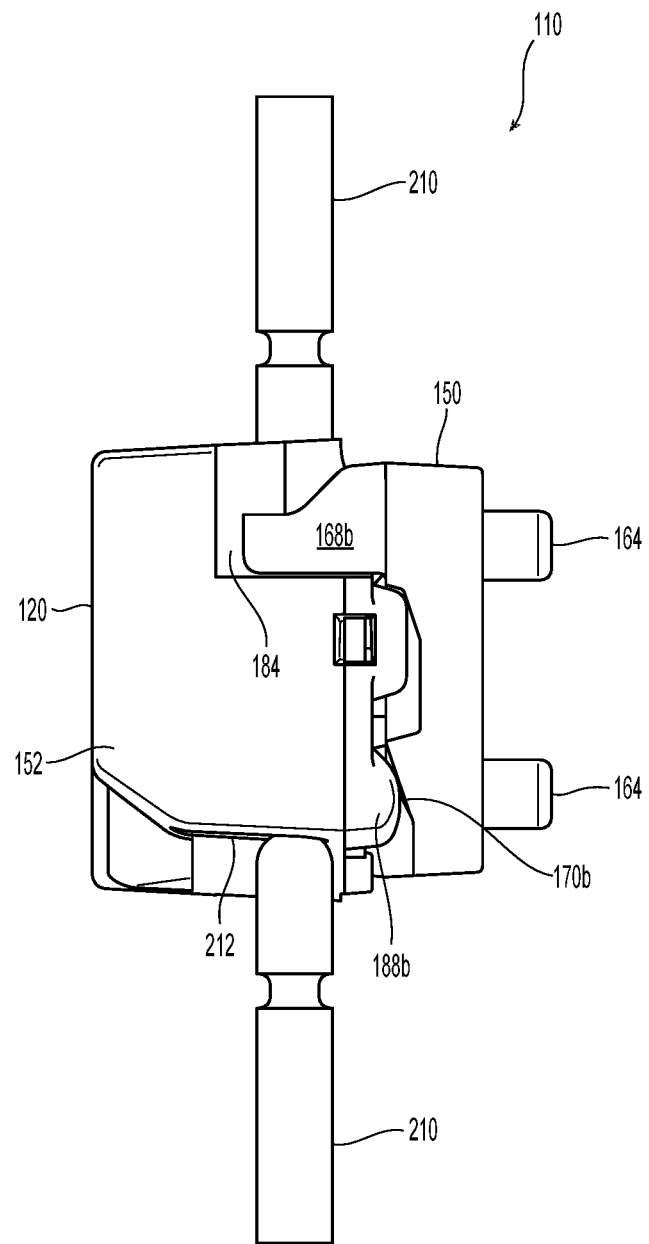
FIG. 13 is a side view of the pin clamp in FIG. 12 with the tool making contact with the rearward clamp portion to allow for insertion or removal of the guide pins.
Figure 14:
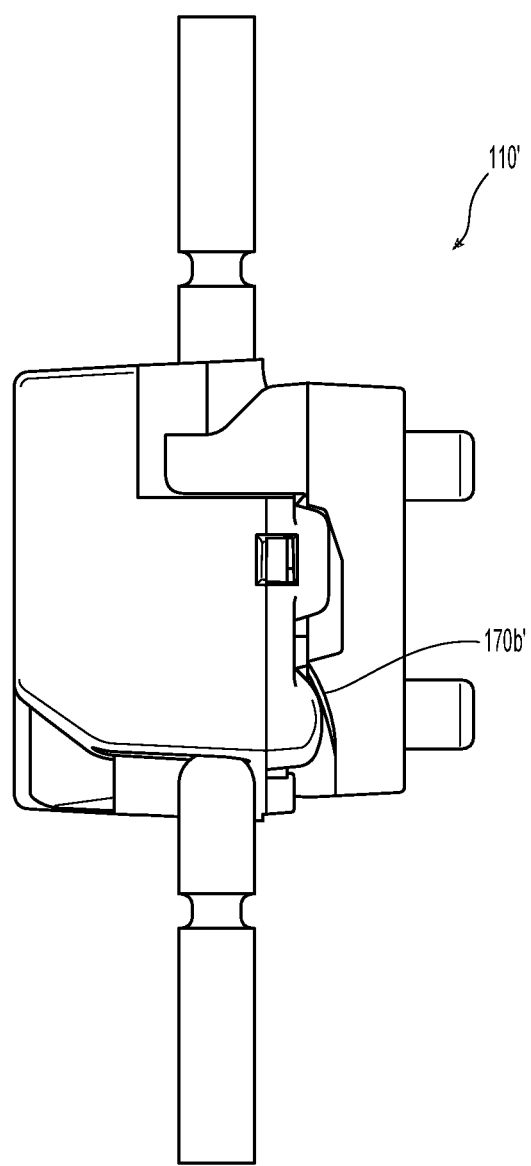
FIG. 14 is a side view of an alternative embodiment of a pin clamp according to the present invention with the tool making contact with the rearward clamp portion to allow for insertion or removal of the guide pins.

The movement of the rearward clamp portion 152 relative to the forward clamp portion 150 is a result of the tabs (172a, 172b, 188a, 188b) and the helical ramp surfaces (170a, 170b, 190a, and 190b) interacting with one another. Turning to FIG. 12, the pin clamp 110 is in the first position, which is the position that the pin clamp is most of the time. At the bottom of the pin clamp, the tab 188b is visible being disposed at the helical ramp surface 170b. In FIG. 13, force is being applied to the rearward clamp portion 152 and the top of the rearward clamp portion 152 is being rotated into the page—causing the tab 188b to move up the helical ramp surface 170b. This causes the rearward clamp portion 152 to move a bit rearwardly (to the left in the figure) allowing the guide pin retaining plate 154 to rotate freely with the rearward clamp portion 152, which has been pushed away from the forward clamp portion as a result of the profile of the helical ramp surfaces (170a, 170b, 190a, and 190b). The ramp surfaces, while being disclosed as having a helical profile, could have other profiles as well. For example, FIG. 14 illustrates an alternative embodiment of pin clamp 110' with a more linear profile for the ramp surface 170b'.

Figure 15:
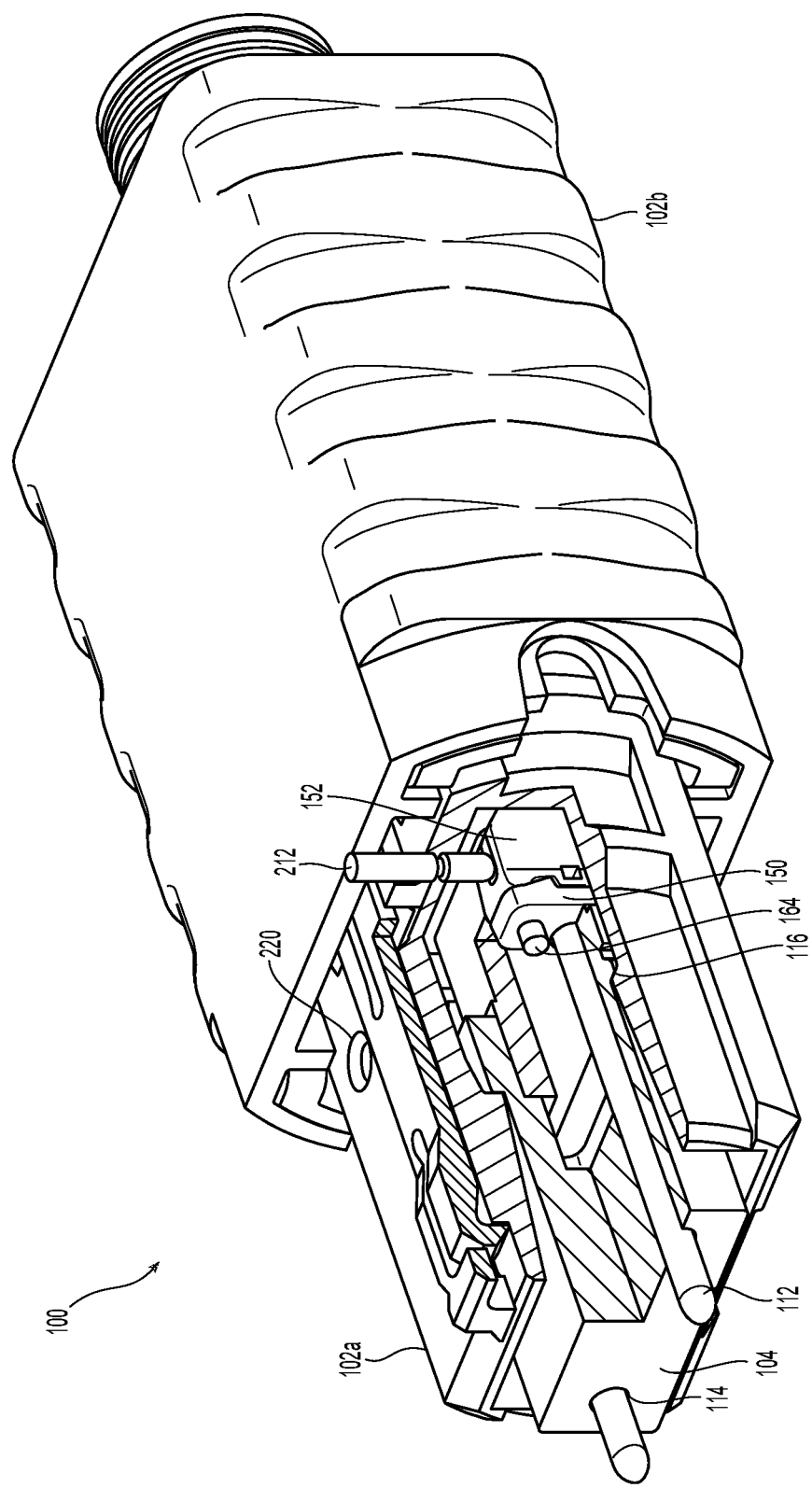
FIG. 15 is a partial cross sectional view of the fiber optic connector according to the present invention with a tool to remove/insert guide pins prior to engagement with the rearward clamp portion and in the first position.
Figure 16:
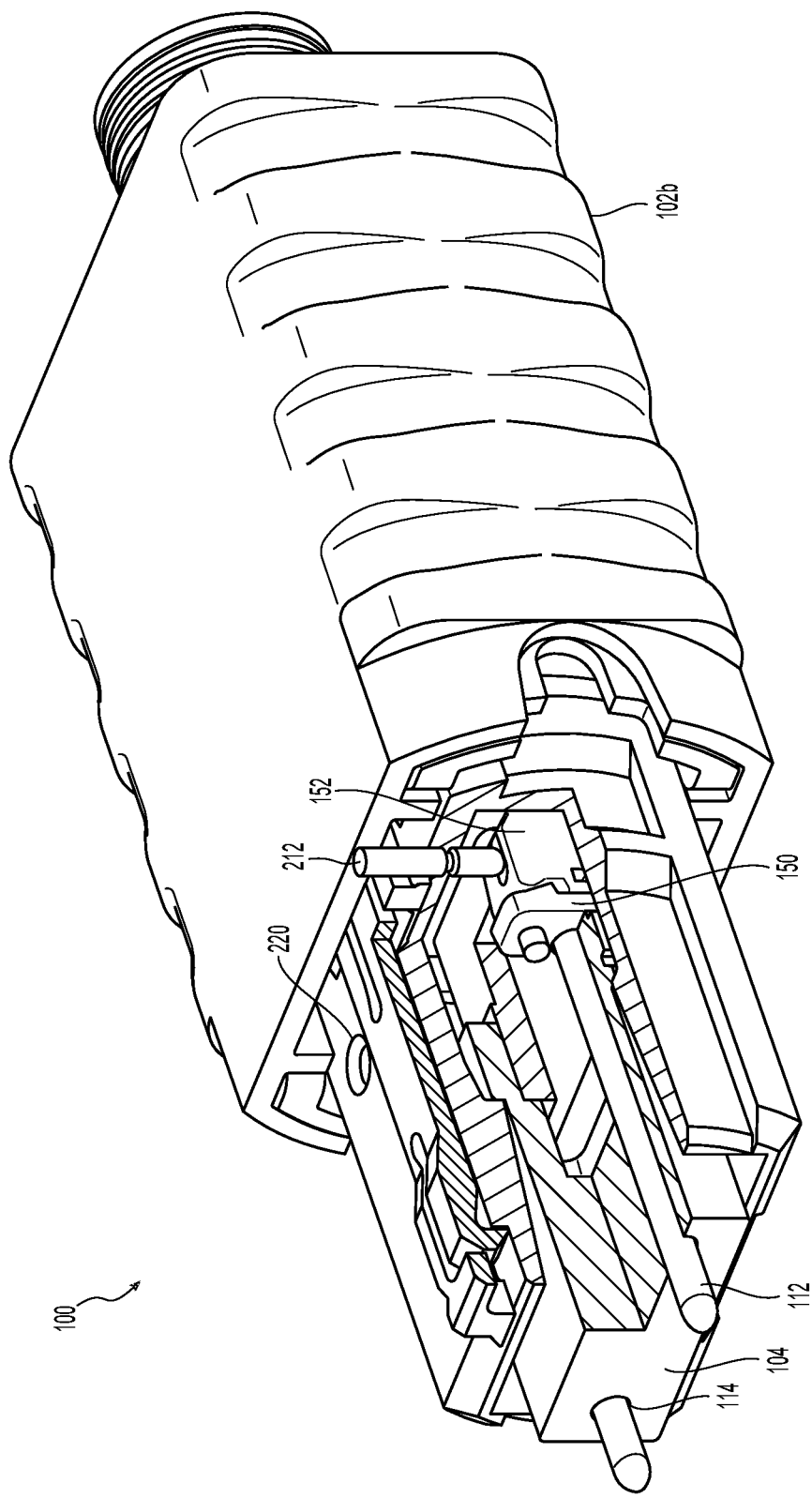
FIG. 16 is a partial cross sectional view of the fiber optic connector of FIG. 13 with the tool engaging the rearward clamp portion and in the second position.

FIG. 15 illustrates the fiber optic connector 100 with the pin clamp 110 in the first position—that is, the tool 210 not yet exerting a force on the rearward clamp portion 152. The inner housing 102a has two openings 220 (one on top of fiber optic connector 100 is illustrated—same on the opposite bottom side) that receives the tool 210 adjacent to the rearward clamp portion 152. FIG. 16 illustrates the movement of the rearward clamp portion 152 relative to the forward clamp portion 152. Thus, FIGS. 15 and 16 correspond to FIGS. 12 and 13.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

We claim:

1. A pin clamp for use with a fiber optic connector, the fiber optic connector having at least one housing, a fiber optic ferrule disposed at least partially within the at least one housing of the fiber optic connector, the fiber optic ferrule having guide pin openings extending from a front face to a rear face of the fiber optic ferrule to receive a guide pin therein, a spring, and a spring push, the pin clamp comprising:

a forward clamp portion to engage the rear face of the fiber optic ferrule, the forward clamp portion having two guide pin openings therethrough to receive a guide pin in each of the two guide pin openings; and a rearward clamp portion movably engaged to the forward clamp portion and configured to engage the spring, wherein the forward clamp portion and the rearward clamp portion are movable relative to one another between a first position in which the guide pin is engaged by the pin clamp and a second position in which the guide pin is released by the pin clamp and wherein the spring biases the pin clamp into the first position.

2. The pin clamp according to claim 1, further comprising a guide pin retaining plate at least partially disposed between the forward clamp portion and the rearward clamp portion.

3. The pin clamp according to claim 1, wherein the forward clamp portion has a front face and a rear face, at least one rearward tab extending from the rear face and away from the forward clamp portion to engage a portion of the rearward clamp portion and at least one sloped surface to engage a tab extending from a front face of the rearward clamp portion.

4. The pin clamp according to claim 2, wherein the rearward clamp portion has a front face and a rear face, the rear face configured to engage the spring for biasing the fiber optic ferrule, at least one sloped surface on the front face of the rearward clamp portion to engage the tab extending from the rear face of the forward clamp portion.

5. The pin clamp according to claim 3, wherein the forward clamp portion and the rearward clamp portion each have two tabs to engage corresponding sloped surfaces on the other of the forward clamp portion and the rearward clamp portion.

6. The pin clamp according to claim 2, wherein the guide pin retaining plate is disposed between the forward clamp portion and the rearward clamp portion, the guide pin retaining plate having two partially circular portions joined by an elongated member, the partially circular portions forming an opening to allow a portion of each of the guide pins to pass therethrough and into the guide pin cavities in the rearward clamp portion.

7. The pin clamp according to claim 6, wherein the front face of the rearward clamp portion has at least one guide pin retaining plate projection and two guide pin retaining plate tabs, each of the guide pin retaining plate tabs having a rearward facing surface, the guide pin retaining plate being disposed between the front face of the rearward clamp portion and the rearward facing surface of the guide pin retaining plate tabs.

8. The pin clamp according to claim 7, wherein the at least one guide pin retaining plate projection comprises two guide pin retaining plate projections, the elongated member of the guide pin retaining plate passing between the two guide pin retaining plate projections.

9. The pin clamp according to claim 6, wherein the rearward clamp portion is moveable between a first position and a second position, and wherein in the second position the guide pin openings in the forward clamp portion and the openings in guide pin retaining plate are aligned with one another.

10. The pin clamp according to claim 9, wherein the guide pin retaining plate moves between the first and second position with the rearward clamp portion.

11. The pin clamp according to claim 9, wherein the guide pin retaining plate engages a guide pin inserted into the fiber optic connector in the first position.

12. The pin clamp according to claim 1, wherein a portion of the fiber optic connector allows access to the rearward clamp portion from outside the fiber optic connector.

13. The pin clamp according to claim 1, wherein the forward clamp portion having at least one projection configured to engage a corresponding opening in the rear face of the fiber optic ferrule, the at least one projection extending from the front face and away from the forward clamp portion.

14. A pin clamp for use with a fiber optic connector, the fiber optic connector having at least one housing, a fiber optic ferrule disposed at least partially within the at least one housing of the fiber optic connector, the fiber optic ferrule having guide pin openings extending from a front face to a rear face of the fiber optic ferrule to receive a guide pin therein, a spring, and a spring push, the pin clamp comprising:

a forward clamp portion to engage the rear face of the fiber optic ferrule, the forward clamp portion having two guide pin openings therethrough to receive a guide pin in each of the two guide pin openings;

a rearward clamp portion movably engaged to the forward clamp portion and configured to engage the spring; and a guide pin retaining plate at least partially disposed between the forward clamp portion and the rearward clamp portion, wherein the forward clamp portion, the rearward clamp portion, and the guide pin retaining plate are movable relative to one another between a first position in which the guide pin is engaged by the pin clamp and a second position in which the guide pin is released.

* * * * *